US010686962B2

(12) United States Patent
Lee et al.

(10) Patent No.: US 10,686,962 B2
(45) Date of Patent: Jun. 16, 2020

(54) GRAPHICAL INDICATOR

(71) Applicant: SONIX Technology Co., Ltd., Hsinchu (TW)

(72) Inventors: Cheng-Ta Lee, Taichung (TW);
Jang-Jer Tsai, Hsinchu (TW);
Tzu-Fong Huang, Hsinchu (TW)

(73) Assignee: SONIX TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 15/903,037

(22) Filed: Feb. 23, 2018

(65) Prior Publication Data

US 2018/0183972 A1 Jun. 28, 2018

Related U.S. Application Data

(63) Continuation of application No. 14/731,417, filed on Jun. 5, 2015, now abandoned.

(30) Foreign Application Priority Data

Jun. 5, 2014 (TW) .............................. 103119595 A

(51) Int. Cl.
*H04N 1/32* (2006.01)
*G06K 19/06* (2006.01)
(52) U.S. Cl.
CPC ... *H04N 1/32251* (2013.01); *G06K 19/06037* (2013.01); *G06K 19/06131* (2013.01); *G06K 19/06178* (2013.01); *H04N 1/32219* (2013.01)
(58) Field of Classification Search
None
See application file for complete search history.

(56) References Cited

U.S. PATENT DOCUMENTS

| 7,549,597 B2 * | 6/2009 | Tsai | ....................... G09F 9/33 235/454 |
|---|---|---|---|
| 2007/0206029 A1 | 9/2007 | Wei et al. | |
| 2008/0252916 A1 | 10/2008 | Huang | |
| 2011/0262047 A1 * | 10/2011 | Wei | ................ G06K 19/06037 382/232 |
| 2012/0298754 A1 | 11/2012 | Lin et al. | |

FOREIGN PATENT DOCUMENTS

| EP | 2439677 | 4/2012 |
|---|---|---|
| EP | 2618287 | 7/2013 |
| WO | 0186582 | 11/2001 |

OTHER PUBLICATIONS

"Search Report of Europe Counterpart Application", dated Mar. 2, 2018, p. 1-p. 10.

* cited by examiner

*Primary Examiner* — Matthew C Bella
*Assistant Examiner* — Brian D Shin
(74) *Attorney, Agent, or Firm* — Haynes and Boone, LLP

(57) ABSTRACT

A graphical indicator comprising a plurality of first header blocks, a plurality of second header blocks and a plurality of data blocks for forming an indicator matrix is provided. Each of the first and second header blocks has a header graphical micro-unit, and each of the data blocks has a data graphical micro-unit. An array area is formed by the second header blocks and the data blocks. A first virtual line and a second virtual line are respectively formed by virtual centers of the first and second header blocks, and an included angle between the first and second virtual lines is less than 90 degrees.

15 Claims, 10 Drawing Sheets

GRAPHICAL INDICATOR

CROSS-REFERENCE TO RELATED APPLICATION

This application is a continuation application of and claims the priority benefit of U.S. application Ser. No. 14/731,417, filed on Jun. 5, 2015, now pending, which claims the priority benefit of Taiwan application serial no. 103119595, filed on Jun. 5, 2014. The entirety of each of the above-mentioned patent applications is hereby incorporated by reference herein and made a part of this application.

BACKGROUND OF THE INVENTION

Field of the Invention

The invention relates to a graphical indicator that can be read by using pattern/image recognition, and the graphical indicator corresponds to indicator data.

Description of Related Art

With advances in printing and electronics, technologies that include graphical indicators together with visible text information or graphic information have been widely applied in daily life. FIG. 1A is a diagram illustrating the coexistence of graphical indicators and main information according to conventional art. As shown in FIG. 1A, a plurality of graphical indicators 102 each comprise a group of graphical micro-units, and the graphical micro-units are formed on an object surface 100. The graphical micro-units are so small that they are visually negligible or are seen only as a halftone gray background. The graphical indicators 102 and the main information 104 (such as the text "APPLE" shown in FIG. 1A) are formed on the object surface 100 (e.g., the surface of a paper sheet) by printing or other suitable techniques. The graphical indicators 102 correspond to indicator data and do not impact the viewer's ability to recognize the main information 104.

FIG. 1B is a diagram illustrating an electronic system 110 according to conventional art. An electronic system 110 includes an optical device 112, a processing device 114 and an output device 116 designed to perform a pattern/image recognition process for reading the graphical indicator 102. The optical device 112, the processing device 114 and the output device 116 are connected to one another in wired or wireless manners. The optical device 112 scans (or photographs) the object surface to obtain an enlarged image. Next, the processing device 114 identifies a graphical indicator 102 from the enlarged image, converts the image of the graphical indicator 102 into digital data, and obtains additional information related to the digital data. Lastly, the output device 116 receives the additional information, and outputs the additional information by a predetermined method. Therefore, based on the design of the graphical indicator 102, additional information may be encoded and carried on a common object surface such as a page of a book.

FIG. 1C is a schematic diagram illustrating a graphical indicator according to conventional art. As shown in FIG. 1C, one graphical indicator 102 (an area surrounded by dash lines) is formed by a header area 212 and a content data area 214 arranged in accordance with a predetermined rule. Specifically, the header area 212 of each graphical indicator 102 facilitates in distinguishing the graphical indicators 102, and the content data area 214 carries indicator data by using the graphical micro-units 216. More specifically, considering FIG. 1C for example, the header information contained in the header area 212 provides a reference for determining the orientation and determining the position and boundaries of the graphical indicator 102 by the electronic system 110.

Generally, when a high proportion of all graphical micro-units 216 in a graphical indicator 102 are located within the header area 212, it indicates that the header information contains more details, so that the electronic system 110 is capable of orienting and positioning the graphical indicator 102 for recognition more accurately. However, if the header area 212 is expanded, the capacity of the graphical indicator 102 to carry indicator data is reduced. On the other hand, if the graphical micro-units 216 are arranged too densely in the content data area 214 or if some of the graphical micro-units 216 in the content data area 214 are too far away from the header area 212, the recognition rate may be lowered for the graphical indicator 102. Accordingly, it is an important issue to be solved by persons skilled in the art as how to design a graphical indicator having a suitable arrangement of the graphical micro-units 216 in the content data area 214 without overly expanding the proportion of the graphical indicator 102 occupied by the header area 212 to increase the recognition rate.

SUMMARY OF THE INVENTION

Accordingly, the invention is directed to a graphical indicator capable of an increased recognition rate for the graphical indicator during image recognition process.

The invention provides a graphical indicator, that comprises a plurality of first header blocks, a plurality of second header blocks and a plurality of data blocks for forming a graphical indicator matrix. Each of the first header blocks and the second header blocks has a header graphical micro-unit. Each of the data blocks has a data graphical micro-unit. An array area is formed by the second header blocks and the data blocks. A first virtual line is formed by virtual centers of the first header blocks, a second virtual line is formed by the virtual centers of the second header blocks, and an included angle between the first virtual line and the second virtual line is less than 90 degrees.

The invention provides a graphical indicator, which comprises both a linear area and an array area. The linear area comprises a plurality of header blocks, and each of the blocks has a header graphical micro-unit. A graphical indicator matrix is formed by the array area and the linear area.

The dimension of the graphical indicator matrix is M×N, and M and N are positive integers, respectively greater than 2. The array area is comprised of a plurality of linear sub-array areas that are positioned so that they are parallel to the linear area. Each of the linear sub-array areas has a plurality of blocks and comprises at least one header graphical micro-unit and a plurality of data graphical micro-units respectively disposed in the blocks according to an arrangement sequence. The arrangement sequences of all the linear sub-array areas in the graphical indicator matrix are not completely identical. Each of the data graphical micro-units is selectively and respectively disposed in one of a plurality of virtual areas of the block. The header graphical micro-units represent header information, and the data graphical micro-units represent indicator data.

The graphical indicators are merged into a graphical indicator structure. In the graphical indicator structure, the number of the data graphical micro-units that can be consecutively arranged in each column of the graphical indicator structure and the number of the data graphical micro-units that can be consecutively arranged in each row of the graphical indicator structure are not over M−1 and N−1.

One of the header graphical micro-units of each of the array areas is selectively disposed at a virtual center of the corresponding block or deviated from the virtual center of the corresponding block, and the rest of the header graphical micro-units are located at the virtual centers of the corresponding blocks.

Based on the above, in the present invention, the graphical indicator is a matrix comprising header graphical micro-units and the data graphical micro-units. By accurately disposing the header graphical micro-units and the data graphical micro-units in the graphical indicator matrix, the graphical indicator may provide a more efficient recognition rate during the image recognition process while maximizing the data payload for the graphical indicators.

Several embodiments accompanied with drawings are described in detail as follows.

BRIEF DESCRIPTION OF THE DRAWINGS

The accompanying drawings are incorporated in and constitute a part of this application. The drawings illustrate embodiments of the invention and, together with the description, serve to explain the principles of the invention.

DESCRIPTION OF THE EMBODIMENTS

Figure 1A:
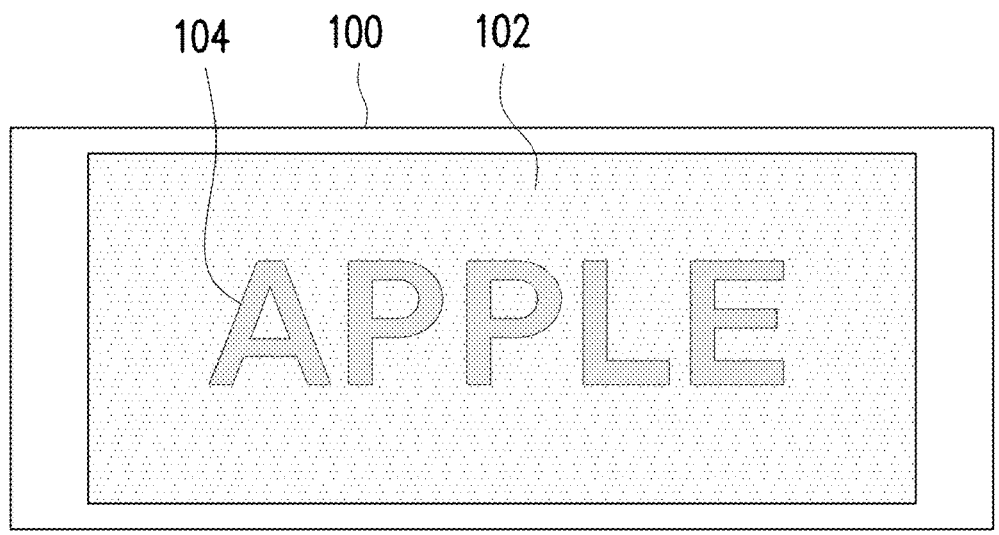
FIG. 1A is a diagram illustrating a coexistence of a graphical indicator and main information according to conventional art.

Reference is made in detail to the present embodiments of the invention, examples of which are illustrated in the accompanying drawings. Wherever possible, the same reference numbers are used in the drawings and the description to refer to the same or like features.

Figure 2A:
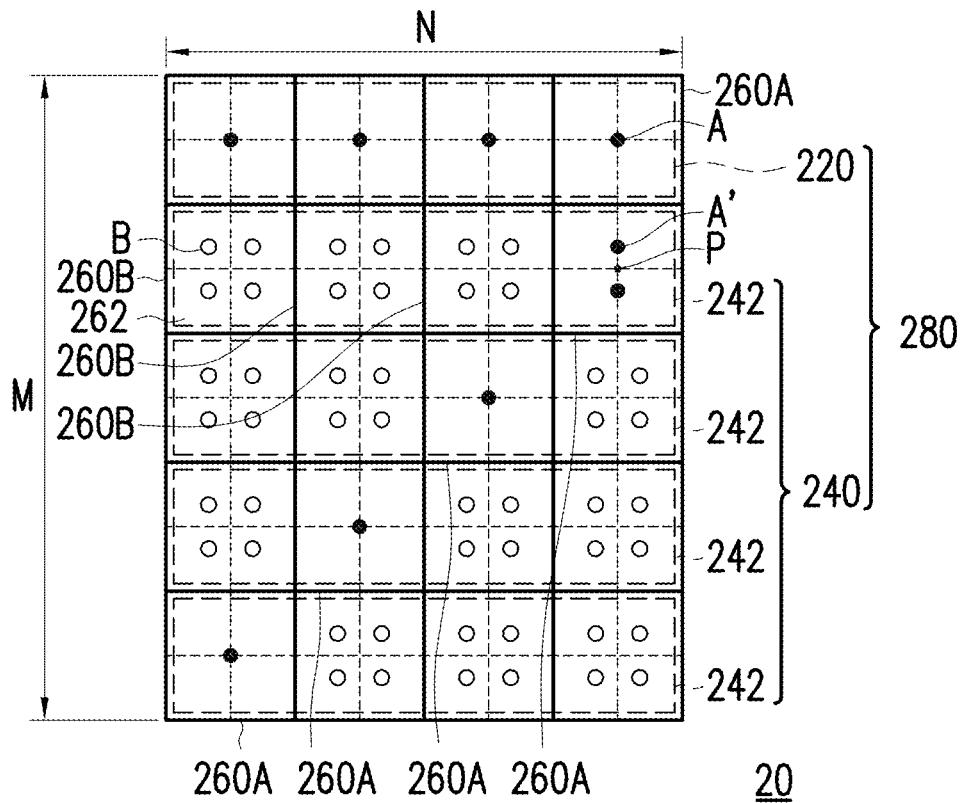
FIG. 2A is a diagram illustrating a graphical indicator according to an embodiment of the invention.

FIG. 2A is a diagram illustrating a graphical indicator according to an embodiment of the invention. Referring to FIG. 2A, a graphical indicator 20 comprises a linear area 220 and an array area 240. The linear area 220 comprises a plurality of header blocks 260A, and each of the header blocks 260A has a header graphical micro-unit A. The array area 240 comprises a plurality of linear sub-array areas 242, each of which comprises a plurality of data blocks 260B and one or more header blocks 260A.

More specifically, in the illustrated embodiment, the graphical indicator matrix 280 is formed by the header blocks 260A and the data blocks 260B that comprise the array area 240 and the linear area 220. Further, the dimension of the graphical indicator matrix 280 is M×N blocks, and M and N are positive integers respectively greater than 2. In the present embodiment, M is 5 and N is 4 for example, but the invention is not limited thereto.

The array area 240 is comprised of a plurality of linear sub-array areas 242 parallel to the linear area 220. Each of the linear sub-array areas 242 has a plurality of data blocks 260B, at least one header block 260A, and comprises at least one of the header graphical micro-units A and a plurality of data graphical micro-units B respectively disposed in the data blocks 260B according to an arrangement sequence. Each of the data graphical micro-units B is selectively and respectively disposed in one of a plurality of virtual areas 262 of the data block 260B. The header graphical micro-units A present header information, and the data graphical micro-units B present indicator data. It should be noted that, the arrangement sequences of all the linear sub-array areas 242 in the graphical indicator matrix 280 are not completely identical.

Figure 1B:
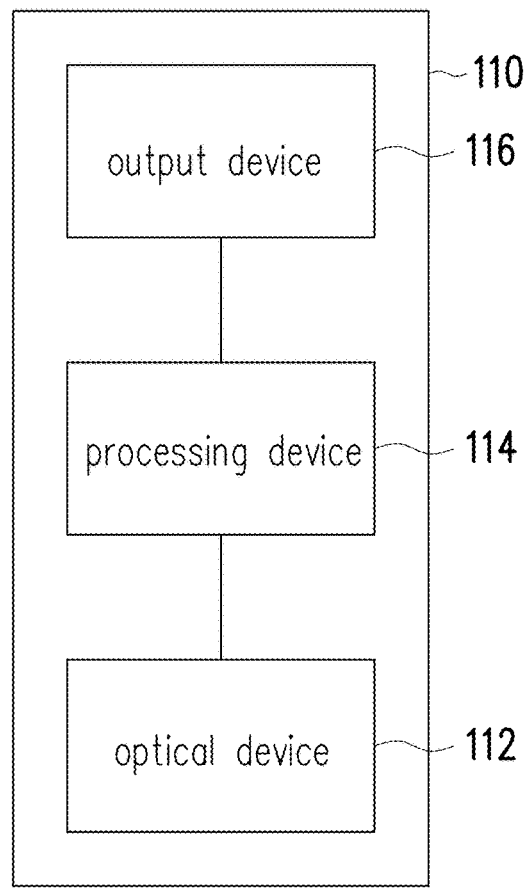
FIG. 1B is a diagram illustrating an electronic system according to conventional art.
Figure 1C:
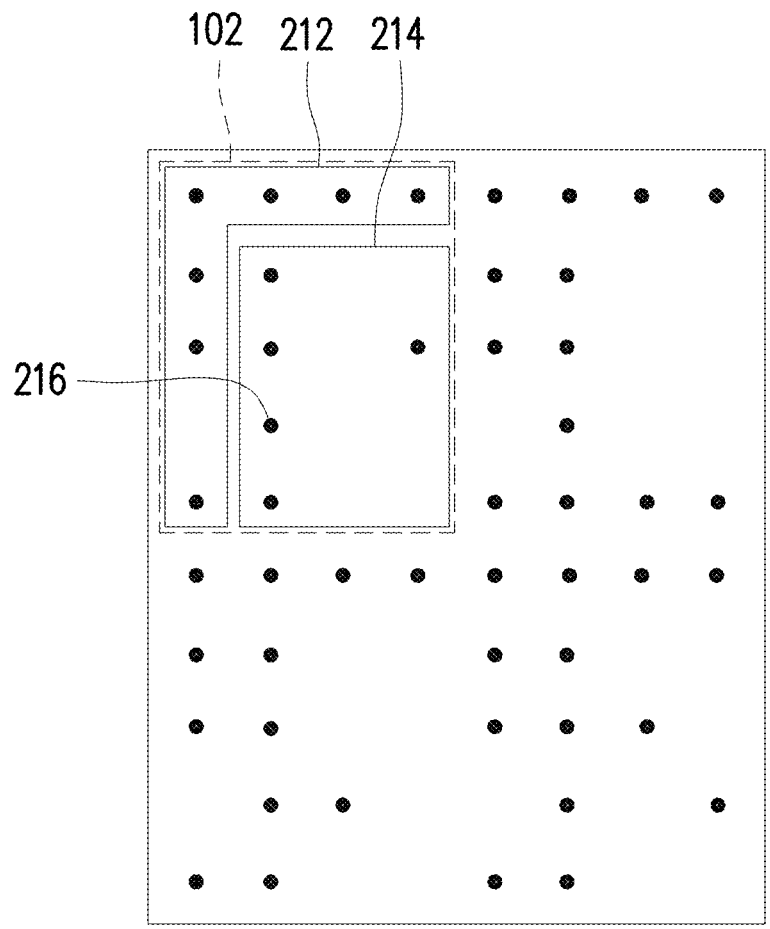
FIG. 1C is a diagram illustrating a graphical indicator according to conventional art.

Each of the header blocks 260A and data blocks 260B comprises one graphical micro-unit A or B. In FIG. 2A, the data graphical micro-units B illustrated in data blocks 260B merely indicate possible placements of the data graphical micro-unit B within the data block 260B, they are not intended to indicate that there are a plurality of data graphical micro-units B contained in one single data block 260B. The data blocks 260B present a corresponding set of bit values based on the placement of the data graphical micro-units B therein, and the header blocks 260A present the header information by the header graphical micro-units A. When image recognition is performed on the graphical indicator 20, the header information can assist the electronic system 110 of FIG. 1B in orienting and positioning. One header graphical micro-unit A' may be selectively disposed at a virtual center P of the corresponding header block 260A, or deviated from the virtual center P of the header block 260A as shown in the two alternative positions above and below virtual center P as shown in FIGS. 2A and 2C, or in alternative positions left and right of virtual center P, so as to further assist the electronic system 110 for orienting and positioning. Note that only one header graphical micro-unit A or A' would be used in each header block 260A, two are shown only to illustrate to potential positions offset from virtual center P.

Figure 2B:
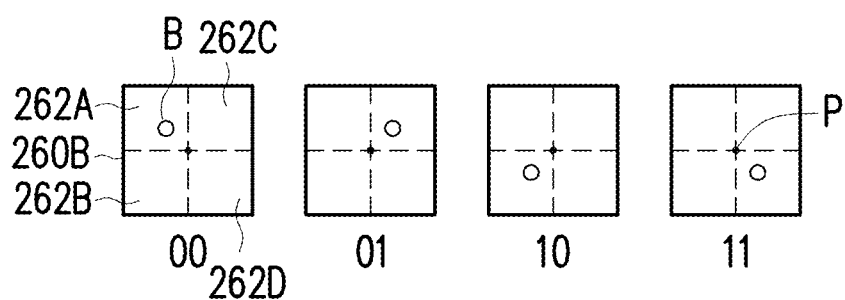
FIG. 2B is a diagram illustrating a data block according to an embodiment of the invention.
Figure 2C:
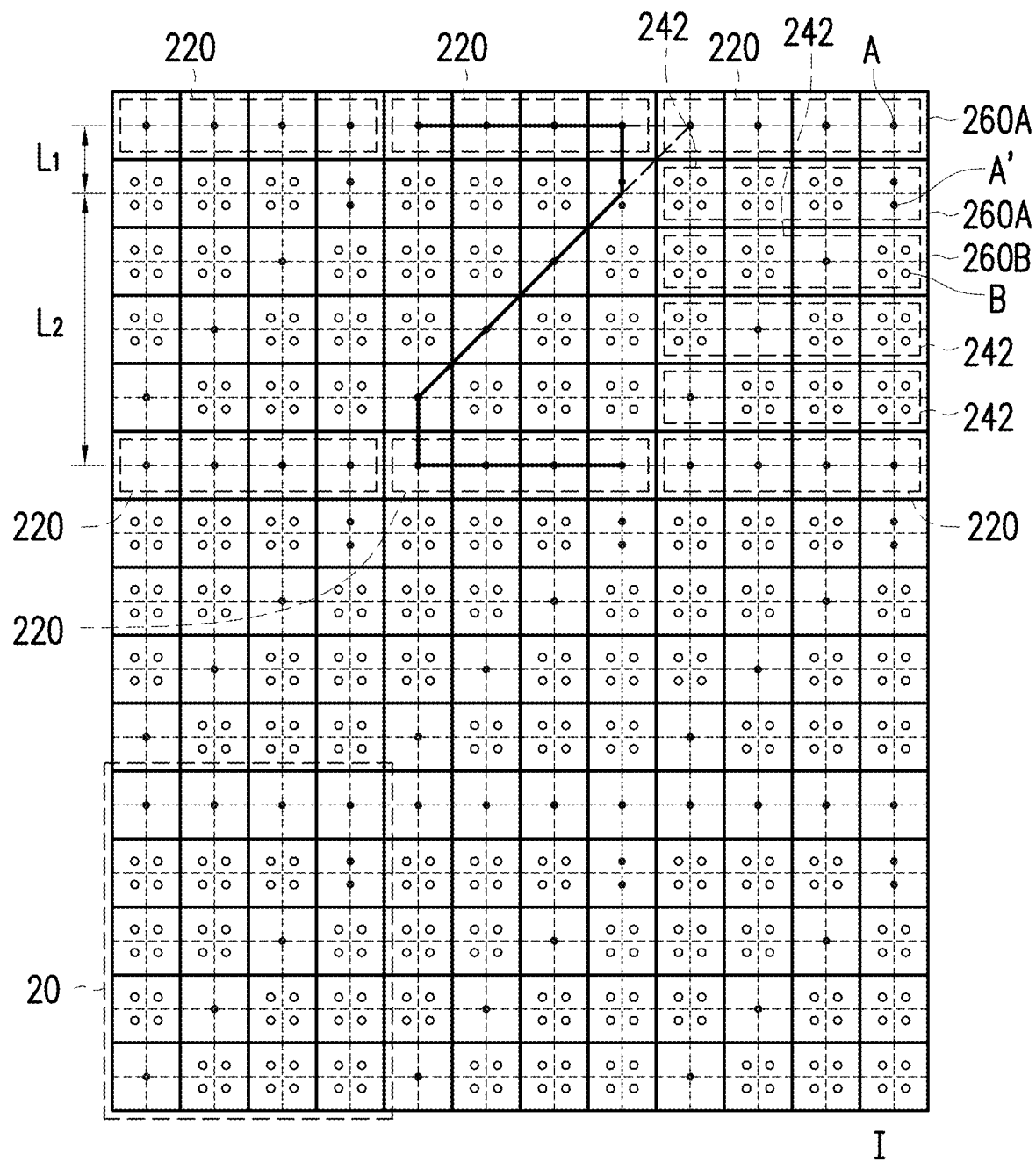
FIG. 2C is a diagram illustrating a graphical indicator structure according to an embodiment of the invention.

FIG. 2B is a diagram illustrating a data block 260B according to an embodiment of the invention. Referring to FIGS. 2A and 2B, in the present embodiment, each of the data blocks 260B is further divided into a first virtual area 262A, a second virtual area 262B, a third virtual area 262C and a fourth virtual area 262D, but the number of the virtual areas in each of the blocks is not limited thereto. In other embodiments, each of the data blocks 260B may be further divided into, for example, 6, 8, 10, 16 or 32 virtual areas. In the present embodiment, the data graphical micro-unit B is selectively disposed in the first virtual area 262A, the second virtual area 262B, the third virtual area 262C or a fourth virtual area 262D, such that the block 260B may be corresponding to one of the bit values 00, 01, 10 or 11. More specifically, the embodiment of FIG. 2B illustrates that the data blocks 260B represent different bit values according to a position of the data graphical micro-unit B relative to the virtual center P within the block. As such, the indicator data of the graphical indicator 20 may be obtained by combining the bit values represented by all the data blocks 260B in the graphical indicator 20.

Referring back to FIG. 2A, in the present embodiment, the graphical indicator 20 is the graphical indicator matrix 280 having 5 rows and 4 columns (M=5, N=4). In other word, M and N are the positive integers respectively greater than 2. The graphical indicator matrix 280 is comprised of the linear area 220 and the array area 240, and the array area 240 is comprised of the linear sub-array areas 242 parallel to the linear area 220. The linear area 220 has four header blocks 260A, and each of the linear sub-array areas 242 comprises one header block 260A and three data blocks 260B. The header graphical micro-units A and the data graphical micro-units B are respectively disposed in the header blocks 260A and data blocks 260B of the linear sub-array area 242 according to an arrangement sequence.

In FIG. 2A, the arrangement sequences of all the linear sub-array areas 242 in the graphical indicator 20 are not identical. In the array area 240, the header blocks 260A to which the header graphical micro-units A belong are located on an oblique line through the array area 240, and each of the data blocks 260B outside the oblique line has the data graphical micro-unit B. In the present embodiment, the oblique line is a diagonal line across the array area 240, but the invention is not limited to this arrangement. The graphical indicator 20 comprises at least M+N−1 number (i.e., 8) of the header graphical micro-units A.

FIG. 2C is a diagram illustrating a graphical indicator structure according to an embodiment of the invention. Referring to FIG. 2A to FIG. 2C, a graphical indicator structure I is formed by merging a plurality of graphical indicators 20. The graphical indicators 20 are merged into the graphical indicator structure I. In the graphical indicator structure I, the number of the data graphical micro-units B that can be consecutively arranged in each column of the graphical indicator structure I and the number of the data graphical micro-units B that can be consecutively arranged in each row of the graphical indicator structure I are not over 3 (i.e., not over M−1=4 and N−1=3). Therefore, when the image recognition is performed on graphical indicator structure I, the electronic system is capable of easily orienting and positioning the header graphical micro-units A in the graphical indicator structure I after the enlarged image is obtained, so as to substantially increase the recognition rate for the graphical indicator structure I.

More specifically, referring to FIGS. 2A to 2C, if the header blocks 260A in the linear area 220 are regarded as first header blocks and the header blocks 260A disposed with the header graphical micro-units (A, A') in the array area 240 are regarded as second header blocks, the first header blocks are disposed at one side of the array area 240 and horizontally arranged in the linear area 220 of the graphical indicator matrix 280, and the second header blocks are obliquely arranged in the array area 240 of the graphical indicator matrix 280. A first virtual line formed by the virtual centers P of the first header blocks and a second virtual line formed by the virtual centers P of the second header blocks forms an included angle, and the included angle is less than 90 degrees (referring to FIG. 2C).

It should be noted that, regardless of whether the graphical indicator structure I in FIG. 2C is inverted, the header blocks 260A to which the header graphical indicators A belong are all arranged into a plurality of Z-shapes. In other words, the arrangement of the header blocks 260A to which the header graphical micro-units A belong remains unchanged even if the graphical indicator structure I is inverted. For the graphical indicator structure I as described above, if the electronic system performs the recognition and intends to read the indicator data when the graphical indicator structure I is inverted, a recognition error may occur because the header graphical micro-units A cannot be used for orienting correctly and positioning correctly.

In order to solve the aforesaid issue so that the system can determine the proper orientation, as noted above one header graphical micro-unit A' in each of the array areas 240 can be deviated from the virtual center P of the corresponding header block 260A. In FIGS. 2A to 2C, the header graphical micro-units A' illustrated in header block 260A merely indicate possible placements of the header graphical micro-units A' instead of marking that there are a plurality of the header graphical micro-units A' contained in one single header block 260A. Distances from the blocks 260A, to which the header graphical micro-units A' belong, to the neighboring two of the linear areas 220 are not equidistant ($L_1$ is not equal to $L_2$), and the rest of the header graphical micro-units A are located at the virtual centers P of the corresponding header blocks 260A. Accordingly, by deviating one header graphical micro-unit A', the electronic system may determine a relation between the relative positions of the header graphical micro-unit A' and the header graphical micro-units A in the neighboring linear areas 220 for further positioning the graphical indicator structure I.

In the present embodiment, distances from the header blocks 260A, to which the header graphical micro-units A' deviated from the virtual center P belong, to neighboring two of the linear areas 220 (or the header blocks 260A of the neighboring linear area 220) are not equidistant. It should be noted that, if the arrangement of the header blocks 260A to which the header graphical micro-units (A, A') belong correspondingly changes when the graphical indicator structure I is inverted, one header graphical micro-unit A' in the array area 240 may be selectively disposed at the virtual center P of the corresponding header block 260A or deviated from the virtual center P of the corresponding header block 260A.

Referring back to FIG. 2A, in another embodiment of the invention, when the header block 260A has the header graphical micro-unit A' deviated from the virtual center P, the block 260A may also correspond to one bit value. More specifically, when the image recognition is performed on the image of graphical indicator 20, the electronic system may further calculate for the bit value (or bit values) represented by the header block 260A according to the relation between the relative position of the header graphical micro-unit A' to the virtual center P of the header block 260A. In other words, by using the header graphical micro-unit A' in the header block 260A, the amount of the indicator data carried in the graphical indicator 20 may be increased. Moreover, even if the graphical indicator structure does not require the header graphical micro-unit A' to be deviated from the virtual center P, the header graphical micro-unit A' can still be used in this way to increase the amount of the indicator data carried in the graphical indicator 20.

Figure 3A:
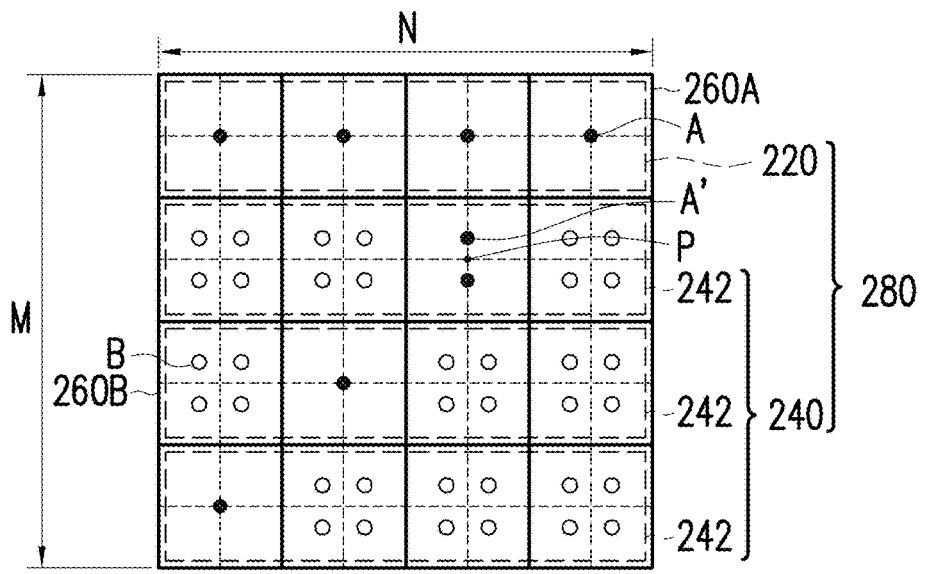
FIG. 3A is a diagram illustrating a graphical indicator according to another embodiment of the invention.
Figure 3B:
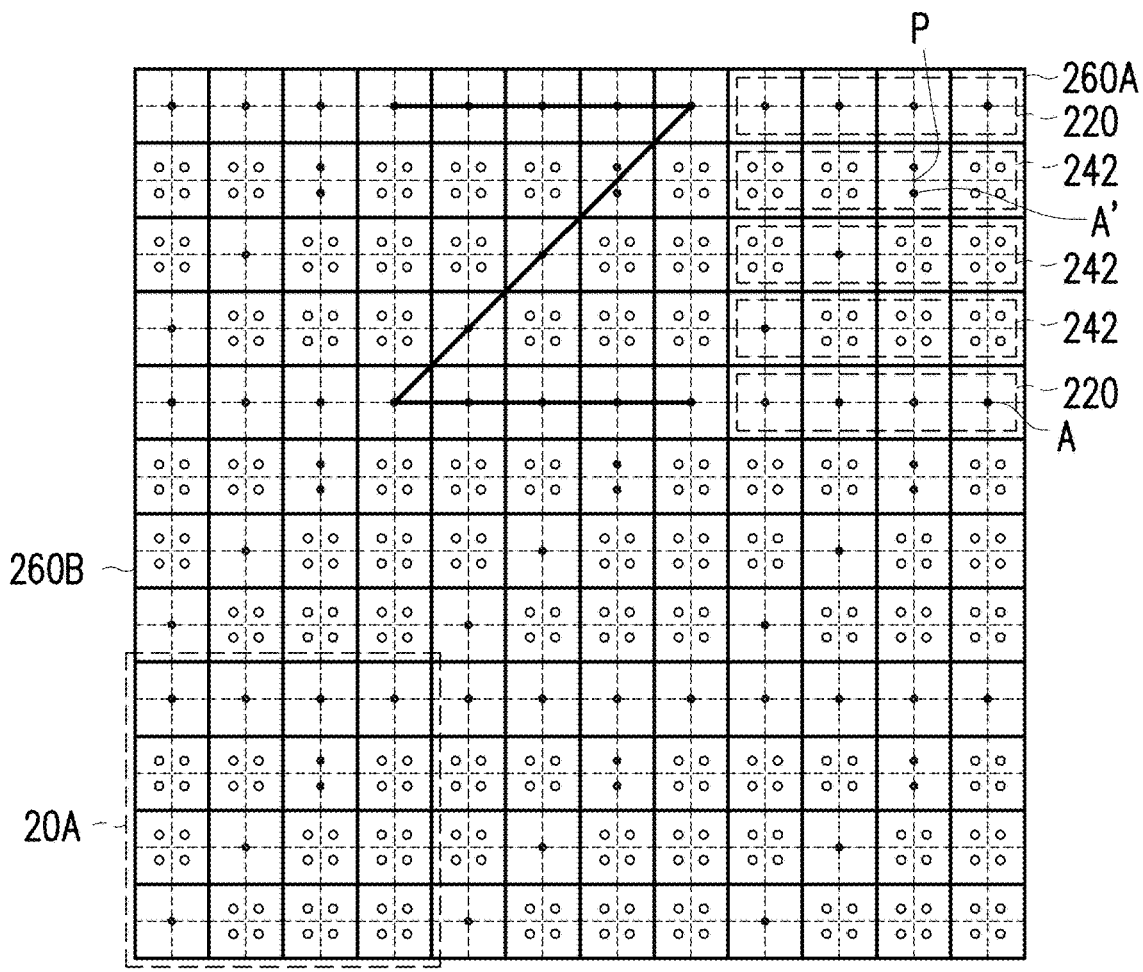
FIG. 3B is a diagram illustrating a graphical indicator structure according to another embodiment of the invention.

FIG. 3A is a diagram illustrating a graphical indicator according to another embodiment of the invention. FIG. 3B is a diagram illustrating alternative graphical indicator structure according to another embodiment of the invention. Referring to FIGS. 3A and 3B, a graphical indicator 20A is the graphical indicator matrix 280 having 4 rows and 4 columns (M=4, N=4). Similarly, the graphical indicator matrix 280 of the graphical indicator 20A is comprised of a linear area 220 and the array area 240, and the array area 240 is comprised of the linear sub-array areas 242 parallel to the linear area 220. The linear area 220 has four header graphical micro-units A, and each of the linear sub-array areas 242 has one header graphical micro-unit A and three data graphical micro-units B which are disposed in the header blocks 260A and data blocks 260B according to an arrangement sequence. The arrangement sequences of all the linear sub-array areas 242 in the graphical indicator 20A are not identical. More specifically, in the array area 240, the header blocks 260A to which the header graphical micro-units A belong are located on an oblique line through the array area 240, and each of the data blocks 260B outside the oblique line has a data graphical micro-unit B. One of the header blocks 260A on the oblique line is adjacent to the linear area 220. The graphical indicator 20A at least comprises a M+N−1 number (i.e., 7) of the header graphical micro-units A.

As similar to the graphical indicator 20 in FIGS. 2A to 2C, if the header blocks 260A in the linear area 220 of the graphical indicator 20A are regarded as first header blocks and the header blocks 260A disposed with the header graphical micro-units (A, A') in the array area 240 are regarded as second header blocks, the first header blocks are horizontally arranged in the linear area 220 of the graphical indicator matrix 280, and the second header blocks are obliquely arranged in the array area 240 of the graphical indicator matrix 280. In this case, a first virtual line formed by the virtual centers P of the first header blocks and a second virtual line formed by the virtual centers P of the second header blocks forms an included angle, and the included angle is less than 90 degrees (referring to FIG. 3B). Unlike the graphical indicator 20, the second header blocks of the graphical indicator 20A are not arranged on the diagonal line of the array area 240 extending from corner to corner of the array area 240.

In FIG. 3B, it can be seen that in a graphical indicator structure IA, the number of the data graphical micro-units B that can be consecutively arranged in each column of the graphical indicator structure IA and the number of the data graphical micro-units B that can be consecutively arranged in each row of the graphical indicator structure IA are not over 3 (i.e., not over M−1=N−1=3). In addition, similar to FIG. 2C, regardless of whether the graphical indicator structure IA is inverted, the header blocks 260A to which the header graphical micro-units A belong shows the same arrangement. Therefore, by deviating one header graphical micro-unit A' in each of the array areas 240 from the virtual center P of the corresponding header block 260A, the electronic system can determine a relation between relative positions of the header block 260A and the neighboring linear areas 220 when the recognition is performed to thereby further positioning the graphical indicator structure IA.

Figure 4A:
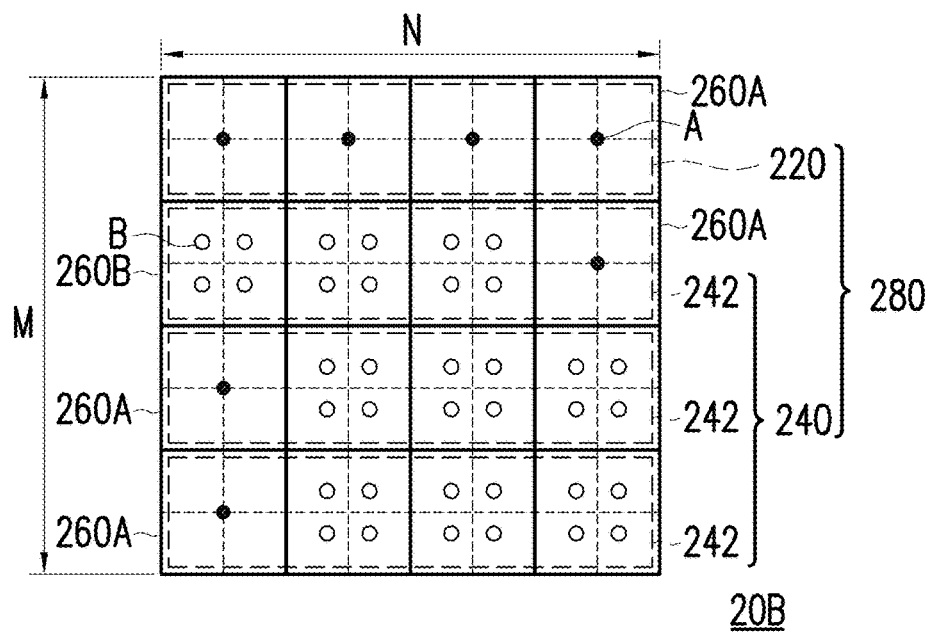
FIG. 4A is a diagram illustrating a graphical indicator according to another embodiment of the invention.
Figure 4B:
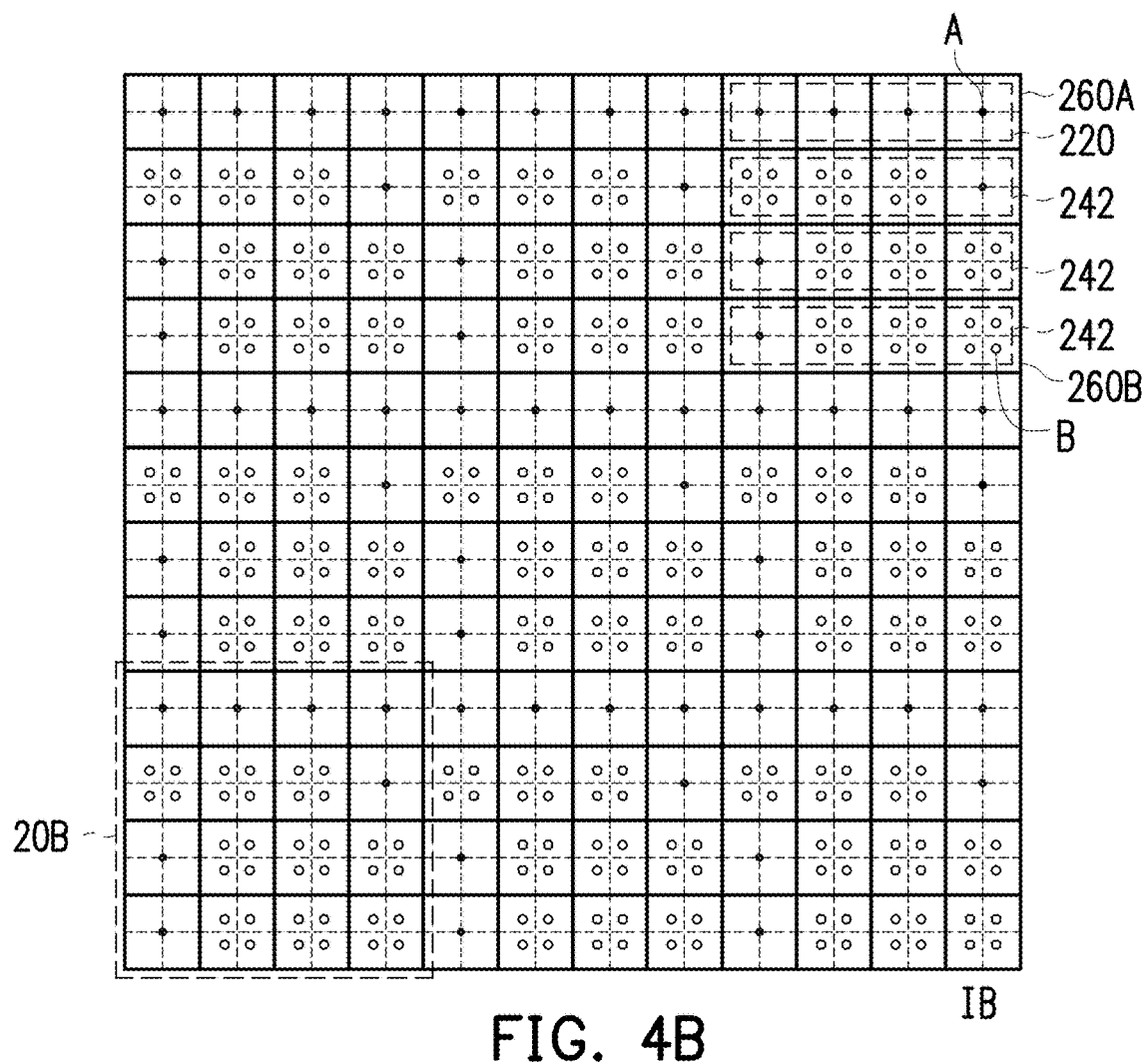
FIG. 4B and FIG. 4C are diagrams illustrating a graphical indicator structure according to another embodiment of the invention.
Figure 4C:
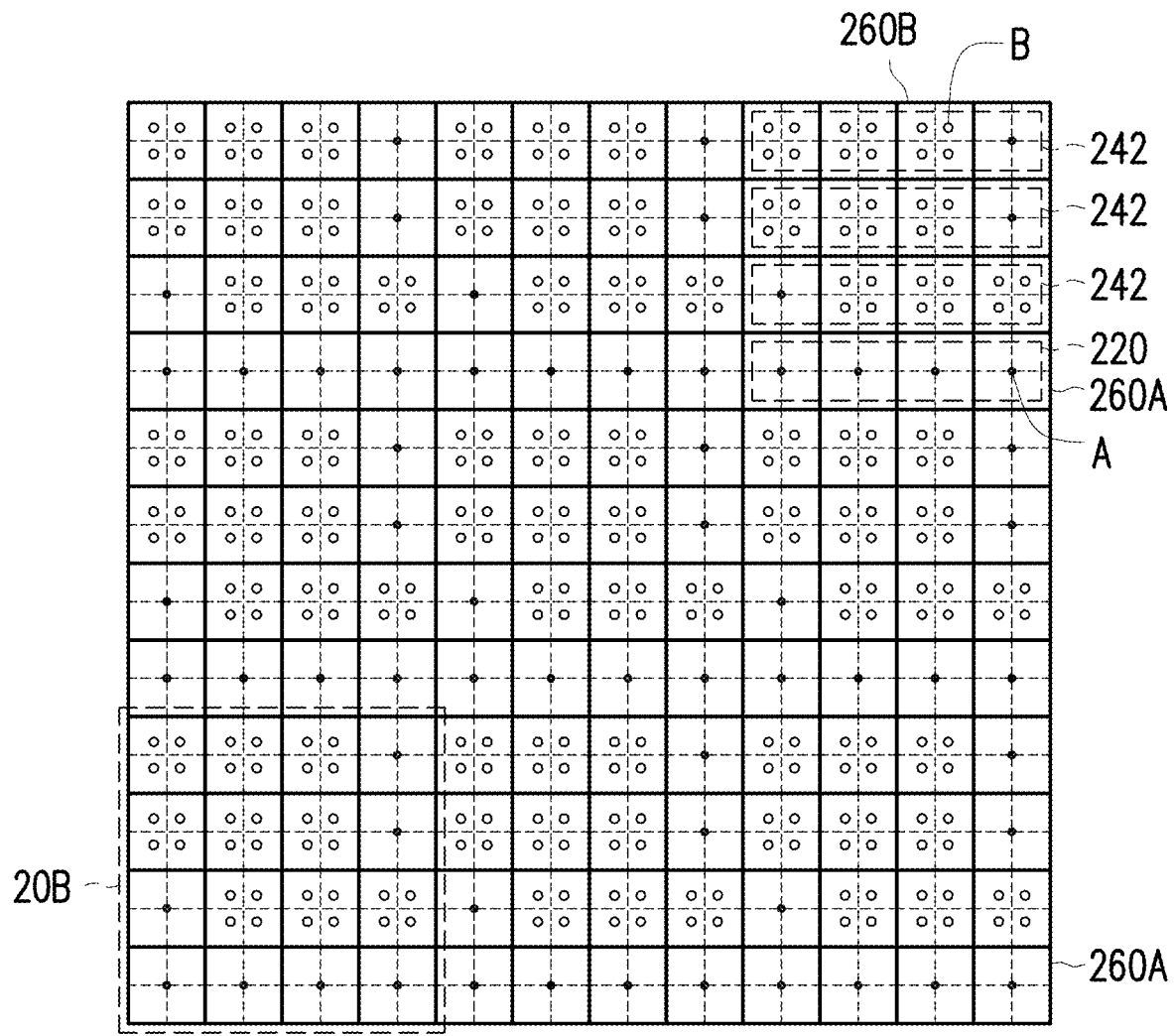

The design of the graphical indicators is not limited only to the embodiments in FIGS. 2A to 2C and FIGS. 3A to 3B. FIG. 4A is a diagram illustrating a graphical indicator according to another embodiment of the invention. FIG. 4B and FIG. 4C are diagrams illustrating a graphical indicator structure according to another embodiment of the invention. As compared to the graphical indicator 20 in FIG. 2A, a graphical indicator 20B in FIG. 4A comprises three linear sub-array areas 242, in which two of the linear sub-array areas 242 have the same arrangement sequence for the header graphical micro-unit A and the data graphical micro-unit B while one of the linear sub-array area 242 has a different arrangement sequence for the header graphical micro-unit A and the data graphical micro-unit B. In the array area 240, the positions of the header blocks 260A to which the header graphical micro-units A belong cannot be crossed by one oblique line across the array area 240.

Referring to FIG. 4B and FIG. 4C, unlike graphical indicator structures I and IA, in this embodiment the arrangement of the header blocks 260A when the graphical indicator structure IB is not inverted (FIG. 4B) and when the graphical indicator structure IB is inverted (FIG. 4C) are different. Under such circumstance, it is not necessary to deviate the header graphical micro-units A in the array area 240, and the electronic system is capable of positioning and orienting directly through the header graphical micro-units A of the graphical indicator 20B. In this design, the amount of indicator data carried in the graphical indicator 20B may also be effectively increased by deviating the position of the header graphical micro-unit A' from the virtual center of the header block 260A.

Figure 5A:
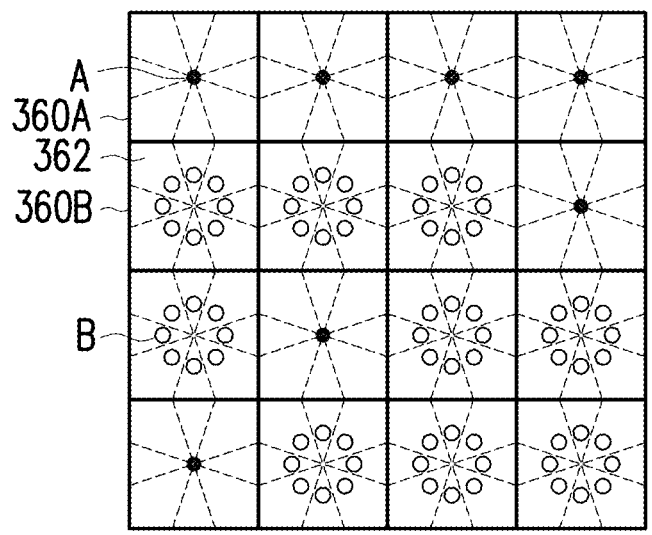
FIG. 5A is a diagram illustrating a graphical indicator according to another embodiment of the invention.
Figure 5B:
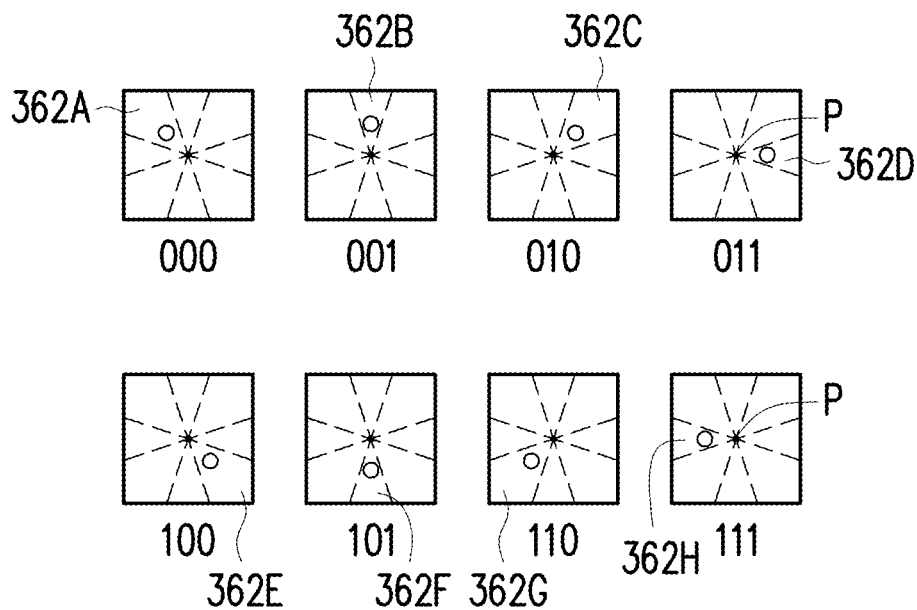
FIG. 5B is a schematic diagram illustrating a data block according to another embodiment of the invention.

FIG. 5A is a diagram illustrating a graphical indicator 30 according to another embodiment of the invention. FIG. 5B is a diagram illustrating a data block according to another embodiment of the invention. Referring to FIG. 5A and FIG. 5B, a graphical indicator 30 comprises the header graphical micro-units A and the data graphical micro-units B, which are disposed in header blocks 360A and data blocks 360B respectively. The data graphical micro-units B are selectively and respectively disposed in one of a plurality of virtual areas 362 of the data block 360B. Unlike the foregoing embodiments, each of the blocks 360B is further divided into a first virtual area 362A, a second virtual area 362B, a third virtual area 362C, a fourth virtual area 362D, a fifth virtual area 362E, a sixth virtual area 362F, a seventh virtual area 362G and an eighth virtual area 362H. In other words, possible positions for disposing the data graphical micro-units B surrounds the virtual center P in an encircling manner for example. The data graphical micro-unit B is selectively disposed in one of the first virtual area to the eighth virtual area (362A to 362H), so that the data block 360B corresponds to one of bit values 000, 001, 010, 011, 100, 101, 110 and 111. As in the prior discussions, the representation of multiple data graphical micro-units B in one data block 360B is only to show the various positions available for the data graphical micro-unit and does not indicate the presence of multiple data graphical micro-units in one data block 360B.

The design for the data block 360B still uses the position of the data graphical micro-unit B relative to the virtual center P of the data block 360B for indicating the bit value represented by the block 360B. However, in the present embodiment, the valid number of bits in the bit value is increased by one bit as compared to the bit value in the embodiment of FIG. 2B. In other words, the amount of the indicator data carried by the graphical indicator 30 may be effectively increased without increasing the density of the data blocks 360B in the graphical indicator 30.

Figure 6A:
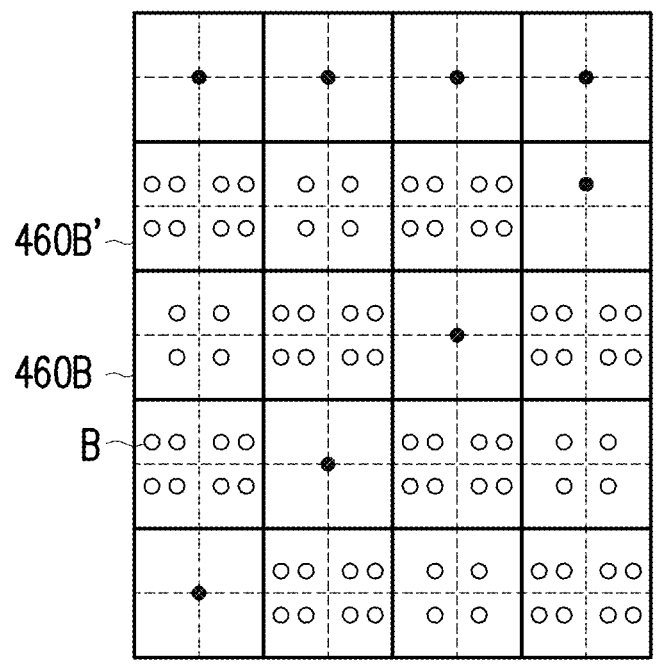
FIG. 6A is a diagram illustrating a graphical indicator according to another embodiment of the invention.
Figure 6B:
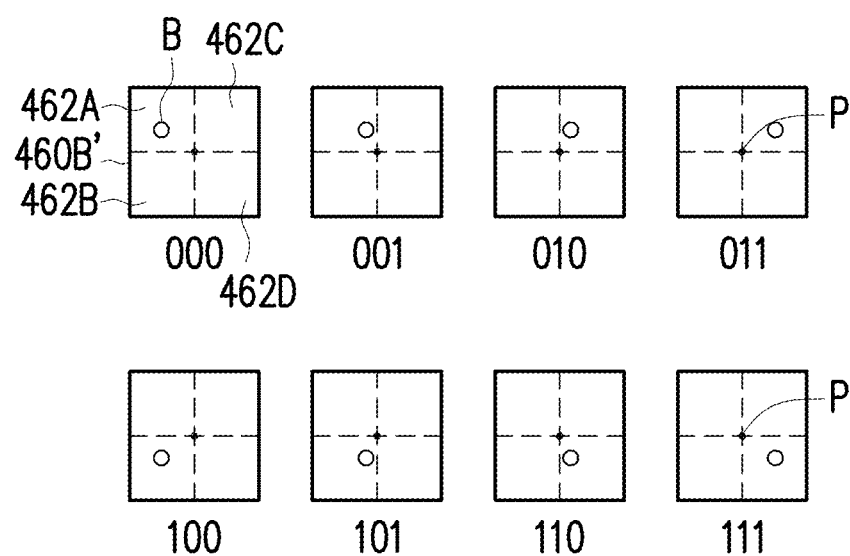
FIG. 6B is a diagram illustrating a data block according to another embodiment of the invention.

FIG. 6A is a diagram illustrating a graphical indicator 40 according to another embodiment of the invention. FIG. 6B is a diagram illustrating a data block according to another embodiment of the invention. Referring to FIG. 6A and FIG.

6B, each of data blocks 460B and 460B' of graphical indicator 40 is divided into a first virtual area 462A, a second virtual area 462B, a third virtual area 462C and a fourth virtual area 462D. Yet, the data block 460B' corresponds to a bit value or several bit values based on the position of the data graphical micro-unit B within the virtual area (462A to 462D) where the data graphical micro-unit B is located.

Referring to FIG. 6B for example, even if the data graphical micro-units B are all disposed in the first virtual area 462A, the position of the data graphical micro-unit B within the first virtual area 462A can still enable the data block 460B' to represent bit data 000 or 001. For example, the data graphical micro-units B in the data block 460B' may be disposed on a position closer to the edge of the data block 460B'. In order to prevent the data graphical micro-unit B being mistakenly grouped as part of the neighboring data block 460B' for being too close to the edge of the data block 460B' when two consecutive data blocks 460B' are disposed on the same row, the data blocks 460B and the data blocks 460B' may be disposed in an alternating manner.

Figure 6C:
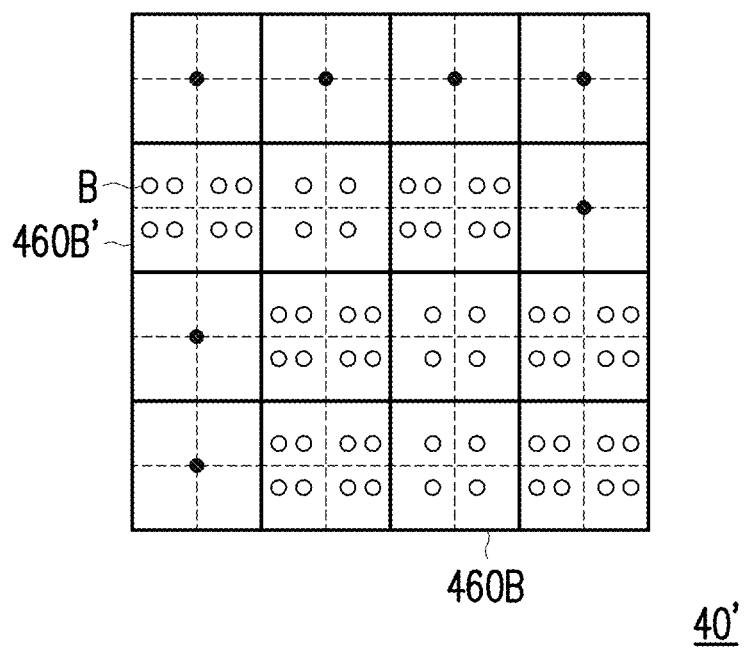
FIG. 6C is a diagram illustrating a graphical indicator according to another embodiment of the invention.

FIG. 6C is a diagram illustrating a graphical indicator according to another embodiment of the invention. As in FIG. 6A, graphical indicator 40' comprises the data blocks 460B and the 460B' on each row of data blocks disposed in an alternating manner. It will be noted that the graphical indicator 40' and the graphical indicator 40 use differing positioning methods for the header graphical micro-units.

Figure 7:
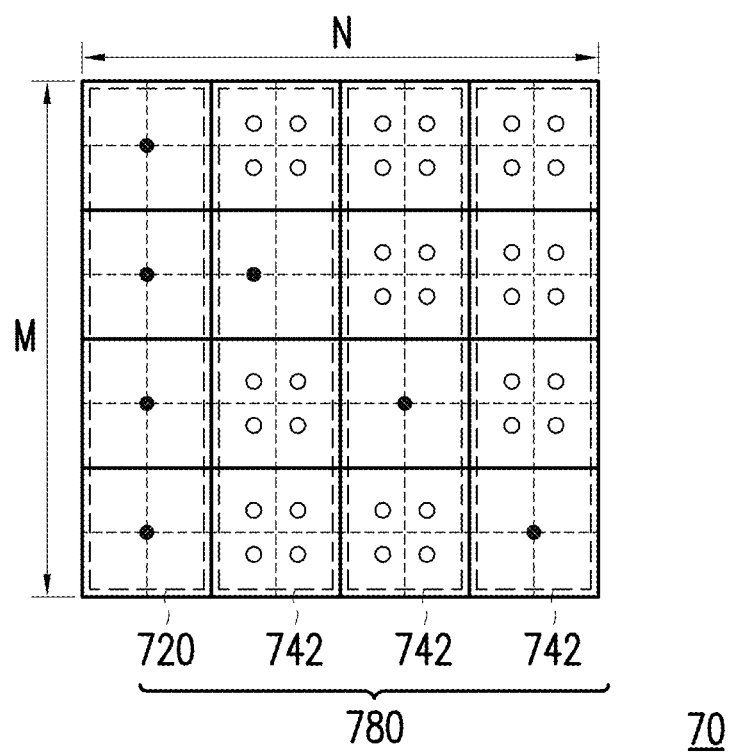
FIG. 7 is a diagram illustrating a graphical indicator according to another embodiment of the invention.

FIG. 7 is a diagram illustrating a graphical indicator according to another embodiment of the invention. Referring to FIG. 7, in comparison with the embodiment of FIG. 2A, graphical indicator 70 is a graphical indicator matrix 780 also having 4 rows and 4 columns (M=4, N=4), but the arrangement of linear area 720 and a plurality of linear sub-array areas 742 in the graphical indicator matrix 780 is different from that of the linear area 220 and the linear sub-array areas 242. Other detailed settings regarding the graphical indicator 70 may refer to related descriptions for aforesaid graphical indicators 20, 20A to 20B, 30, 40, 40', which are not repeated hereinafter.

In summary, in the present invention, a graphical indicator is a graphical indicator matrix, which comprises header graphical micro-units and data graphical micro-units. By accurately positioning the header graphical micro-units and the data graphical micro-unit in the graphical indicator matrix, the graphical indicator may provide a better recognition rate during the image recognition process.

Although the present disclosure has been described with reference to the above embodiments, it will be apparent to one of ordinary skill in the art that modifications to the described embodiments may be made without departing from the spirit of the present disclosure. Accordingly, the scope of the present disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A physical object comprising a graphical indicator, wherein the graphical indicator is for storage of information and is disposed as part of and visible on the object, the graphical indicator comprising:
an indicator matrix,
the indicator matrix comprising a linear array area and an array area,
the array area comprising a plurality of linear sub-array areas parallel to the linear array area,
a plurality of first header blocks within the linear array area and a plurality of second header blocks within the array area, each first and second header block having a header graphical micro-unit, the first and second header blocks representing header information that provides a reference for determining orientation and position of the indicator matrix; and
a plurality of data blocks within the array area, each having a data graphical micro-unit, the data blocks representing data different from the header information,
wherein to aid in recognition rate of the graphical indicator:
the second header blocks are arranged in the array area and oblique relative to the first header blocks, and
a first virtual line is formed within the linear array area by virtual centers of the first header blocks, a second virtual line is formed within the array area by virtual centers of the second header blocks, and an included angle between the first virtual line and the second virtual line is less than 90 degrees.

2. The object of claim 1, wherein the first header blocks are disposed at one side of the array area.

3. The object of claim 1, wherein one of the header graphical micro-units in the second header blocks is selectively disposed at the virtual center of the corresponding second header block or deviated from the virtual center of the second header block, and the rest of the header graphical micro-units are located at the virtual centers of the corresponding second header blocks.

4. The object of claim 3, wherein a plurality of graphical indicators are merged into a graphical indicator structure, when an arrangement of the first header blocks and the second header blocks in the graphical indicator structure does not change along with the graphical indicator structure being inverted, one of the header graphical micro-units in each of the graphical indicators is deviated from the virtual center of the corresponding second header block, distances from the second header block, to which the header graphical micro-unit deviated from the virtual center belong, to neighboring two of the first header blocks are not equidistant, and the rest of the header graphical micro-units are located at the virtual centers of the corresponding second header blocks and the corresponding first header blocks.

5. The object of claim 4, wherein the indicator matrix is disposed on a surface of the object, and wherein the graphical indicator structure surrounds additional information also disposed on the surface.

6. The object of claim 1, wherein each of the data blocks, to which the data graphical micro-units belong, is divided into a first virtual area, a second virtual area, a third virtual area and a fourth virtual area, and the data graphical micro-unit is selectively disposed in the first virtual area, the second virtual area, the third virtual area or the fourth virtual area of the data block, so that the data block is corresponding to a bit value or several bit values.

7. The object of claim 1, wherein the first header blocks are along a row or a column of the indicator matrix.

8. The object of claim 7, wherein a first of the first header blocks is adjacent to one of the second header blocks.

9. The object of claim 8, wherein the first of the first header blocks is at a corner of the indicator matrix, and wherein the one of the second header blocks is also adjacent to at least two of the data blocks.

10. The object of claim 8, wherein the first of the first header blocks is adjacent to a second of the first header blocks, and wherein the second of the first header blocks is at a corner of the indicator matrix.

11. The object of claim 1, wherein the data blocks of the graphical indicator are decodable based at least on an arrangement of the first and second header blocks.

12. The object of claim 1, wherein one of the header graphical micro-units in the second header blocks is deviated from the virtual center of the second header block, and the rest of the header graphical micro-units are located at the virtual centers of the corresponding second header blocks.

13. The object of claim 1, wherein the indicator matrix is disposed on a surface of the object, and wherein the indicator matrix is associated with additional information also disposed on the surface.

14. A system to process the graphical indicator of the object of claim 1, the system comprising:
 an optical device configured to obtain an image of the object, wherein the image comprises the graphical indicator; and
 a processing device configured to convert the graphical indicator into data based on the first header blocks, the second header blocks, and the data blocks.

15. The object of claim 1, wherein the indicator matrix is disposed on a surface of the object.

* * * * *